Sept. 29, 1942. C. A. NICHOLS ET AL 2,297,013
METHOD OF MAKING TEES OF METAL TUBING
Filed April 9, 1941
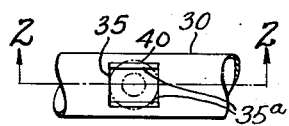
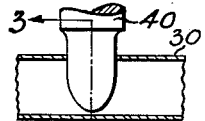
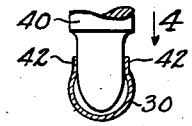
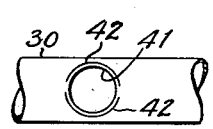
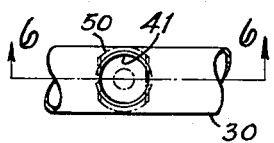
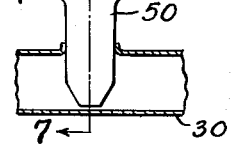
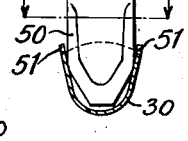
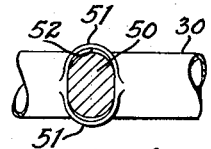
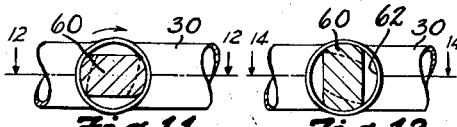
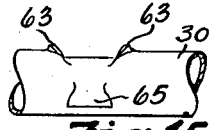
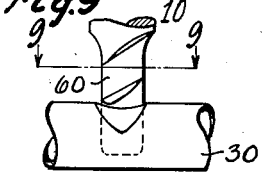
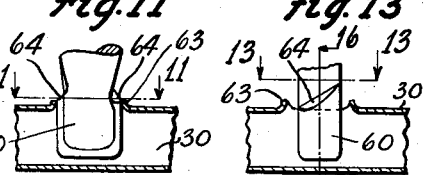
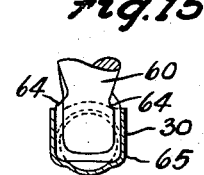
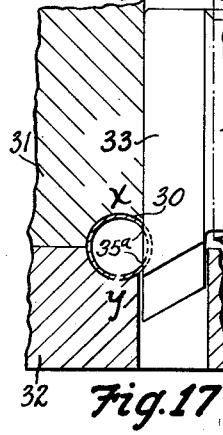
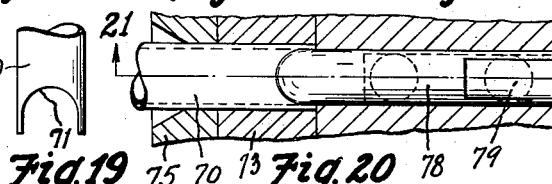
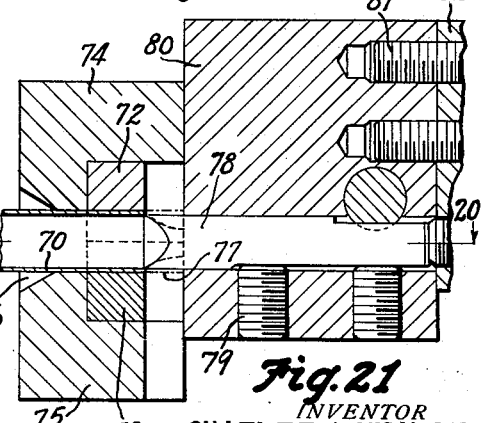
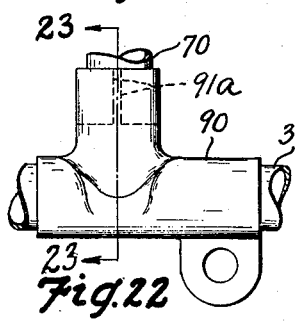
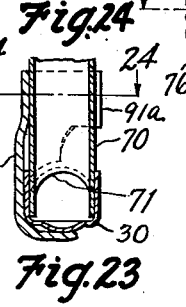
INVENTOR
CHARLES A. NICHOLS
GEORGE L. WEISER
BY
Spencer, Hardman & Fehr
Their ATTORNEYS Patented Sept. 29, 1942

2,297,013

UNITED STATES PATENT OFFICE 2,297,013

METHOD OF MAKING T'S OF METAL TUBING

Charles A. Nichols and George L. Weiser, Anderson, Ind., assignors to General Motors Corporation, Detroit, Mich., a corporation of Delaware Application April 9, 1941, Serial No. 387,566

5 Claims. (Cl. 29—157)

This invention relates to the art of fabricating metal tubing into such articles as an oil conducting manifold for the crank shaft bearings of internal combustion engines.

It is an object of the present invention to provide a method for making a T of metal tubing whereby the manufacture of certain articles fabricated from metal tubing can be carried on economically. In the disclosed embodiment hereof the method comprises removing a portion from one side of a round tube to form a side opening, shaping the portion of the tube surrounding the side opening into circular formation, said portion including arcuate flanges extending outwardly, spreading said flanges apart to provide an opening of approximately elliptical formation, the larger diameter of which is at right angles to the axis of the tube, shaping the portion of the tube defining said elliptical opening into circular formation with arcuate flanges extending outwardly and shaping the side walls of the tube inside the opening into the cylindrical formation in order to provide a socket for receiving another tube, shaping an end of another tube so as to provide diametrically opposite notches, placing the notched end of the second tube within the socket of the first tube with the notches of the second tube aligned with the axis of the first tube and in securing the tube parts together in said relative location.

Further objects and advantages of the present invention will be apparent from the following description, reference being had to the accompanying drawing wherein a preferred embodiment of the present invention is clearly shown.

In the drawing:

Fig. 1 is a fragment of a tube from which a portion of the side wall has been removed.

Fig. 2 is a sectional view on line 2—2 of Fig. 1 and showing in side elevation a punch for performing the first operation upon the tube.

Fig. 3 is a sectional view on line 3—3 of Fig. 2.

Fig. 4 is a view in the direction of the arrow 4 of Fig. 3, the punch having been removed.

Fig. 5 is a view similar to Fig. 4 indicating the application of a punch for forming the second operation.

Fig. 6 is a sectional view on line 6—6 of Fig. 5 showing the punch for performing the second operation in side elevation.

Fig. 7 is a sectional view on the line 7—7 of Fig. 6.

Fig. 8 is a sectional view on line 8—8 of Fig. 7.

Fig. 9 is a view similar to Fig. 8, but showing in cross section punch for performing the third operation. This view is taken on line 9—9 of Fig. 10.

Fig. 10 is a view in the direction of arrow 10 in Fig. 9.

Fig. 11 is a view similar to Fig. 9 showing the punch in a different position. The sectional view of the punch is on the line 11—11 of Fig. 12.

Fig. 12 is a sectional view on line 12—12 of Fig. 11.

Fig. 13 shows the third position of the punch shown in Figs. 9 and 11. The punch is shown in section on line 13—13 of Fig. 14.

Fig. 14 is a sectional view on line 14—14 of Fig. 13.

Fig. 15 is a side elevation of the tube after the third operation has been completed.

Fig. 16 is a sectional view on line 16—16 of Fig. 14.

Fig. 17 is a cross sectional view of the apparatus for performing the first operation indicated in Fig. 1.

Fig. 18 is a sectional view on the line 18—18 of Fig. 17.

Fig. 19 is a side elevation of a notched tube to be assembled with the tube shown in Fig. 16.

Figs. 20 and 21 are views of apparatus for notching the tube shown in Fig. 19. Fig. 20 is a sectional view on line 20—20 of Fig. 21 and Fig. 21 is a sectional view on line 21—21 of Fig. 20.

Fig. 22 is a side elevation of fragments of the tubes shown in Figs. 1 to 19 together with an attachment clip.

Fig. 23 is a sectional view on the line 23—23 of Fig. 22.

Fig. 24 is a sectional view on the line 24—24 of Fig. 23.

A section of tube 30 is placed between blocks 31 and 32 which are notched to conform to the outer cylindrical surface of the tube. While the tube supporting a cutter-blade 33, supported by a movable support 34 is caused to move in a direction parallel to the tube diameter $xy$ (Fig. 17) to remove a portion of the tube to provide a rectangular opening 35 (Fig. 1). A punch 40 (Figs. 2 and 3), indicated diagrammatically by the dot-dash-line circles in Fig. 1, is caused to move through the rectangular opening 35 in order to shape the portion of the tube surrounding this opening into circular formation. The portion of the tube surrounding opening 41 includes arcuate flanges 42. The punch 40 is circular in cross sectional contour and is provided with a tapered end as shown in Figs. 2 and 3. The curvature of punch 40 in an axial direction is such that, when the punch 40 engages the acute side edges 35a (Figs. 1 and 17) bounding the opening 35 in the tube 30, these edges 35a move outwardly, rather than inwardly toward the interior of the tube, because it is easier for the metal of the tube to move in an outward direction rather than to follow down with the punch 40. The edges 35a are relatively thin and are easily bent upwardly as the punch 40 engages them. The displacement of the rest of the metal surrounding the opening 35 readily follows in the upward and outward direction. Thus the opening 35 becomes a circular opening 41 bounded by arcuate flanges 42.

The next operation is to spread apart the flanges 42. This is accomplished by a punch 50, (Figs. 6, 7 and 8) having a cross sectional contour which is somewhat oblong and rounded on the ends. The punch 50 is forced down through the round hole 41 (Fig. 5) and spreads the arcuate flanges 42 into the positions 51 (Figs. 7 and 8) and thus shapes the round hole 41 into a hole 52 which is approximately elliptical in shape. To accomplish this, the punch 50 which is generally oblong in cross sectional contour is provided with a tapered lower end capable of entering the hole 41.

The next operation is to change the shape of the elliptical hole 52 into one of circular contour and to provide a cylindrical socket for receiving another piece of round tubing. This operation is performed by a punch 60 having a cross sectional contour similar to that of the punch 50 as seen by comparing Figs. 9 and 8. The punch 60 is rotated upon its axis, indicated by point 61 (Fig. 9) while being forced through the opening 52. This causes the elliptical opening 52 to be shaped into a circular opening 62 bounded by outwardly extending arcuate flanges 63 and having a diameter equal to the long diameter of the elliptical opening 52. The operation of forming the flanges 63 is performed by inclined camming surfaces 64 of the punch 60 which, as the punch is rotated, engages those portions of the tube 30 surrounding the narrower part of the hole 52 of Fig. 8. As the punch 60 rotates to shape the hole 52 into the round hole 62, the camming surfaces 64 engage the portions of the tubing surrounding the elliptical opening and cause these portions to be formed into outwardly extending arcuate flanges 63. During rotation of the punch 60 it is forced inwardly with respect to the tube in order to shape side wall portions thereof into cylindrical formation as indicated at 65. The tube 30 is thus provided with a side opening and a cylindrical socket for receiving another section of tubing 70 provided with diametrically opposed notches 71 (Fig. 19). These notches are provided by shearing apparatus comprising external shear blocks 72 and 73 supported by blocks 74 and 75 between which the tube section 70 is located by pushing it through the flared opening 76 toward the right to cause its end, indicated by dot-dash-line 77, to move over a shearing punch 78 attached by screws 79 to a block 80 attached by screws 81 to a movable part 82 of a punch press head. The movement of the punch press heads are such that the shearing punch 78 moves from the central location within the tube 70 (Fig. 21) vertically in either of two directions. For example, the punch 78 may move upwardly to shear the upper notch and then downwardly to shear the lower notch and then return to mid-position.

The notched tube 70 is placed within the socket of the tube 30 in the manner shown in Fig. 23 with the notches 71 in alignment with the bore or axis of the tube 30. A clip 90 is assembled with the tube parts 30 and 70 in the manner indicated in Fig. 24 there being flanges 91 which are bent to the positions 91a (Fig. 24) so as to embrace the tube part 70 and to cause it to be held in assembled relation with the tube part 30. Solder is applied to the assembly to seal the joint between parts 30 and 70 and also to secure the clip 90 thereto.

It will be noted that the tube parts 30 and 70 are of the same diameter. The present method provides for shaping of one tube part with a side outlet and cylindrical socket having an inside diameter slightly greater than the outside diameter of the other tube part.

While the embodiment of the present invention as herein disclosed, constitutes a preferred form, it is to be understood that other forms might be adopted, all coming within the scope of the claims which follow.

What is claimed is as follows:

1. The method of making a T of metal tubing which comprises removing a portion from one side of a round tube to form a side opening, shaping the portion of the tube surrounding said opening into circular formation, said portion including arcuate flanges extending outwardly, spreading said flanges apart to provide an opening of approximately elliptical formation, the larger diameter of which is at right angles to the axis of the tube, shaping the portion of the tube defining said elliptical opening into circular formation with arcuate flanges extending outwardly and shaping the side walls of the tube inside the opening into cylindrical formation in order to provide a socket for receiving another tube, shaping an end of another tube to provide diametrically opposite notches, placing the notched end of the second tube within the socket of the first tube with the notches of the second tube aligned with the axis of the first tube, and in securing the tubes together in said relative location.

2. The method of making a T of metal tubing which comprises subjecting a tube to the action of a cutter movable at right angles to the axis of the tube to remove a portion of the tube on one side thereof, forcing a punch of tapering longitudinal contour and circular cross sectional contour through said opening to form a circular opening, forcing a punch of tapering longitudinal contour and oblong cross-sectional contour through said circular opening to form an approximately elliptical opening the longer diameter of which is at right angles to the axis of the tube, inserting a punch of oblong cross sectional contour into said elliptical opening and rotating it while forcing it into the tube in order to form the elliptical opening into a circular opening having a diameter substantially equal to the long diameter of said previously formed elliptical opening, and also subjecting the edges of the tube defining said elliptical opening to the action of camming surfaces provided by said rotary punch in order to force the burr outwardly in the form of outwardly extending annular flanges, said rotary punch shaping the tube to provide a socket for receiving another tube, shaping an end of another tube to provide diametrically opposite notches, placing the notched end of the second tube within the socket of the first tube with the notches of the second tube aligned with the axis of the first tube, and in securing the tubes together in said relative location.

3. The steps in the method of making a T of metal tubing which comprise removing a portion from one side of a round tube to form a side opening, shaping the portion of the tube surrounding said opening into circular formation, said portion including arcuate flanges extending outwardly, spreading said flanges apart to provide an opening of approximately elliptical formation the larger diameter of which is at right angles to the axis of the tube, shaping the portion of the tube defining said elliptical opening into circular formation with arcuate flanges extending outwardly and shaping the side walls of the tube inside the opening into cylindrical formation in order to provide a socket for receiving another tube.

4. The steps in the method of making a T of metal tubing which comprise subjecting a tube to the action of a cutter movable at right angles to the axis of the tube to remove a portion of the tube on one side thereof, forcing a punch of tapering longitudinal contour and circular cross sectional contour through said opening to form a circular opening, forcing a punch of tapering longitudinal contour and oblong cross section contour through said circular opening to form an approximately elliptical opening the longer diameter of which is at right angles to the axis of the tube, inserting a punch of oblong cross sectional contour into said elliptical opening and rotating it while forcing it into the tube in order to form the elliptical opening into a circular opening having a dameter substantally equal to the long diameter of said previously formed elliptical opening, and also subjecting the edges of the tube defining said elliptical opening to the action of camming surfaces provided by said rotary punch in order to force the burr outwardly in the form of outwardly extending annular flanges, said rotary punch shaping the tube to provide a socket for receiving another tube.

5. In the method of making a T of metal tubing, the steps of providing a tube with a substantially elliptical side opening, inserting a punch of oblong cross sectional contour into said elliptical opening and rotating it while forcing it into the tube in order to form the elliptical opening into a circular opening having a diameter substantially equal to the long diameter of said previously formed elliptical opening, and also subjecting the edges of the tube defining said elliptical opening to the action of camming surfaces provided by said rotary punch in order to force the burr outwardly in the form of outwardly extending annular flanges, said rotary punch shaping the tube to provide a socket for receiving another tube.

CHARLES A. NICHOLS.
GEORGE L. WEISER.